(12) United States Patent
Nishio et al.

(10) Patent No.: US 8,689,934 B2
(45) Date of Patent: Apr. 8, 2014

(54) SOUND ABSORBING STRUCTURE

(75) Inventors: Yoshitaka Nishio, Nagoya (JP); Naohito Seko, Kariya (JP)

(73) Assignees: Denso Corporation, Kariya (JP); Toyota Boshoku Kabushiki Kaisha, Kariya (JP)

( * ) Notice: Subject to any disclaimer, the term of this patent is extended or adjusted under 35 U.S.C. 154(b) by 0 days.

(21) Appl. No.: 13/540,735

(22) Filed: Jul. 3, 2012

(65) Prior Publication Data

US 2013/0008739 A1    Jan. 10, 2013

(30) Foreign Application Priority Data

Jul. 6, 2011   (JP) ................................. 2011-150104

(51) Int. Cl.
*F02M 35/00*     (2006.01)
*E04B 1/82*      (2006.01)

(52) U.S. Cl.
USPC ........... 181/229; 181/284; 181/286; 181/290; 181/292; 181/295

(58) Field of Classification Search
USPC ................. 181/229, 284, 286, 290, 292, 295
See application file for complete search history.

(56) References Cited

U.S. PATENT DOCUMENTS

| | | | | |
|---|---|---|---|---|
| 2,014,368 A * | 9/1935 | Blundell | ........................ | 181/269 |
| 2,805,730 A * | 9/1957 | Applegate | ..................... | 181/252 |
| 2,990,907 A * | 7/1961 | Everett | .......................... | 181/256 |
| 3,259,108 A * | 7/1966 | Craig et al. | ................... | 122/149 |
| 3,630,311 A * | 12/1971 | Nagamatsu et al. | .......... | 181/213 |
| 3,739,872 A * | 6/1973 | McNair | ....................... | 181/218 |
| 3,983,956 A * | 10/1976 | Manhart | ....................... | 181/210 |
| 4,038,798 A * | 8/1977 | Sachs | ........................... | 52/309.7 |
| 4,105,089 A * | 8/1978 | Judd | ............................. | 181/264 |
| 4,975,098 A * | 12/1990 | Lee et al. | ........................ | 48/192 |
| 5,444,196 A * | 8/1995 | Woods | .......................... | 181/227 |
| 5,445,861 A * | 8/1995 | Newton et al. | ................ | 428/116 |
| 5,512,715 A * | 4/1996 | Takewa et al. | ................ | 181/295 |
| 6,167,985 B1 * | 1/2001 | Van Ligten | ..................... | 181/286 |
| 8,336,804 B2 * | 12/2012 | Hoetzeldt et al. | ............. | 244/1 N |
| 8,360,201 B2 * | 1/2013 | Tanase | .......................... | 181/291 |
| 2004/0069564 A1 * | 4/2004 | Wang et al. | ..................... | 181/293 |
| 2005/0067220 A1 * | 3/2005 | Keller et al. | .................... | 181/250 |
| 2005/0279568 A1 * | 12/2005 | Seyler et al. | ................... | 181/249 |
| 2006/0035058 A1 * | 2/2006 | Ogawa et al. | ................. | 428/131 |
| 2010/0300801 A1 * | 12/2010 | Maeder | ......................... | 181/294 |
| 2012/0325747 A1 * | 12/2012 | Rietman et al. | .............. | 210/651 |

* cited by examiner

*Primary Examiner* — David Warren
*Assistant Examiner* — Christina Russel
(74) *Attorney, Agent, or Firm* — Nixon & Vanderhye P.C.

(57) ABSTRACT

A sound absorbing structure includes multiple sound absorbers. The sound absorbers are assembled together into a sound absorbing member. The sound absorbing member absorbs sound emitted from a sound source. Each of the sound absorbers is shaped like a hollow tube. Each of the sound absorbers has a hole extending in its axis direction.

6 Claims, 4 Drawing Sheets

SOUND ABSORBING STRUCTURE

CROSS REFERENCE TO RELATED APPLICATION

This application is based on Japanese Patent Application No. 2011-150104 filed on Jul. 6, 2011, the disclosure of which is incorporated herein by reference.

TECHNICAL FIELD

The present disclosure relates to a sound absorbing structure having multiple narrow tube-shaped sound absorbers assembled together into a sound absorbing member or having a porous sound absorber with multiple holes.

BACKGROUND

In a sound absorbing structure disclosed in US2005/0067220 corresponding to JP-2005-84693A, multiple Helmholtz resonators (i.e., resonant silencers) having different resonant frequencies are arranged to obtain a sound absorption characteristic over a wide frequency range.

Specifically, as shown in FIG. 6, the sound absorbing structure includes an inner member 101 and an outer member 102 that surrounds the inner member 101.

The inner member 101 defines an inner wall 104 having openings 103. The outer member 102 defines an outer wall 105 that extends along the inner wall 104 of the inner member 101.

The outer wall 105 forms bellows 106 to improve the sound absorption characteristic and flexibility of the sound absorbing structure. The bellows 106 and the inner wall 104 define cavities 107. The openings 103 of the inner wall 104 are open to the cavities 107.

A resonator, which is used in the conventional sound absorbing structure, is a device designed to absorb sound of a specific frequency. Therefore, to obtain sound absorption characteristics over a wide frequency range, a lot of resonators having different resonant frequencies are needed. As a result, the size of the sound absorbing structure is increased.

The present inventors have conducted an experiment to evaluate the effect of the conventional sound absorbing structure to reduce intake noise. In the experiment, a speaker was placed at one end of the inner member 101, and a microphone was placed at the other end of the inner member 101. Then, white noise was generated from the speaker, and sound caught by the microphone was analyzed by using a fast Fourier transform (FFT) analyzer. FIG. 7 shows a result of the experiment. As can be seen from FIG. 7, the sound absorption characteristic of the conventional sound absorbing structure has an excessive frequency region where the noise is excessively (i.e., unnecessarily) absorbed. Further, the sound absorption characteristic has a worse frequency region near the excessive frequency region. In the worse region, the noise is increased rather than reduced.

SUMMARY

In view of the above, it is an object of the present disclosure to provide a relatively small sound absorbing structure having good sound absorption characteristics over a wide frequency range.

According to an aspect of the present disclosure, a sound absorbing structure includes multiple sound absorbers. The sound absorbers are assembled together into a sound absorbing member for absorbing sound emitted from a sound source. Each sound absorber has a hole extending in its axis direction.

According to another aspect of the present disclosure, a sound absorbing structure includes a porous sound absorber for absorbing sound emitted from a sound source. The porous sound absorber has multiple holes extending in its axis direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

Figure 1:
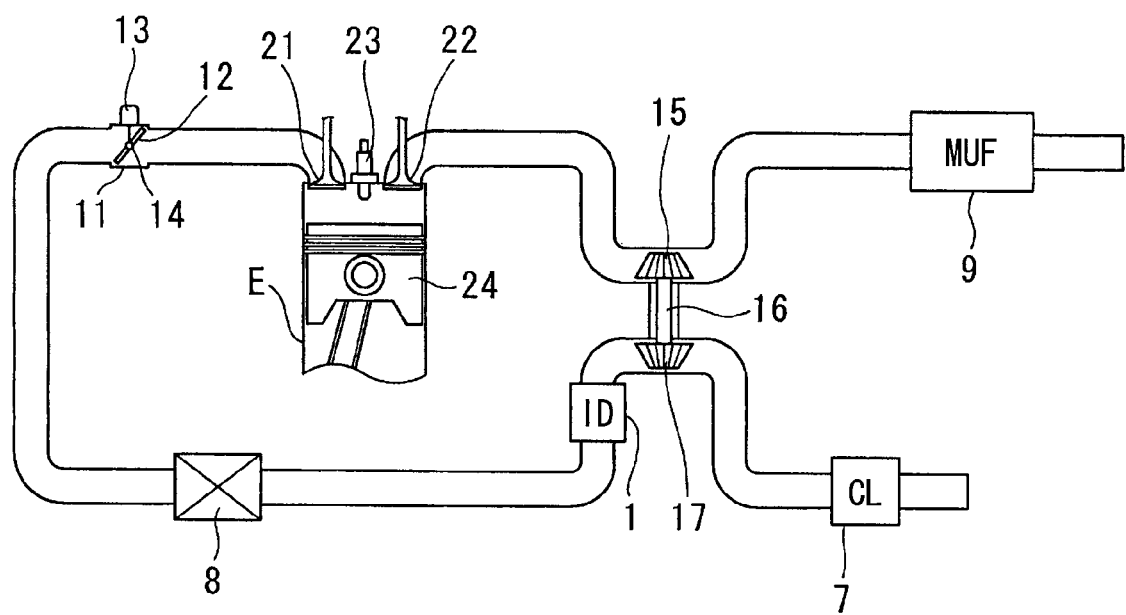
FIG. 1 is a diagram illustrating an engine control system according a first embodiment of the present disclosure.
Figure 2:
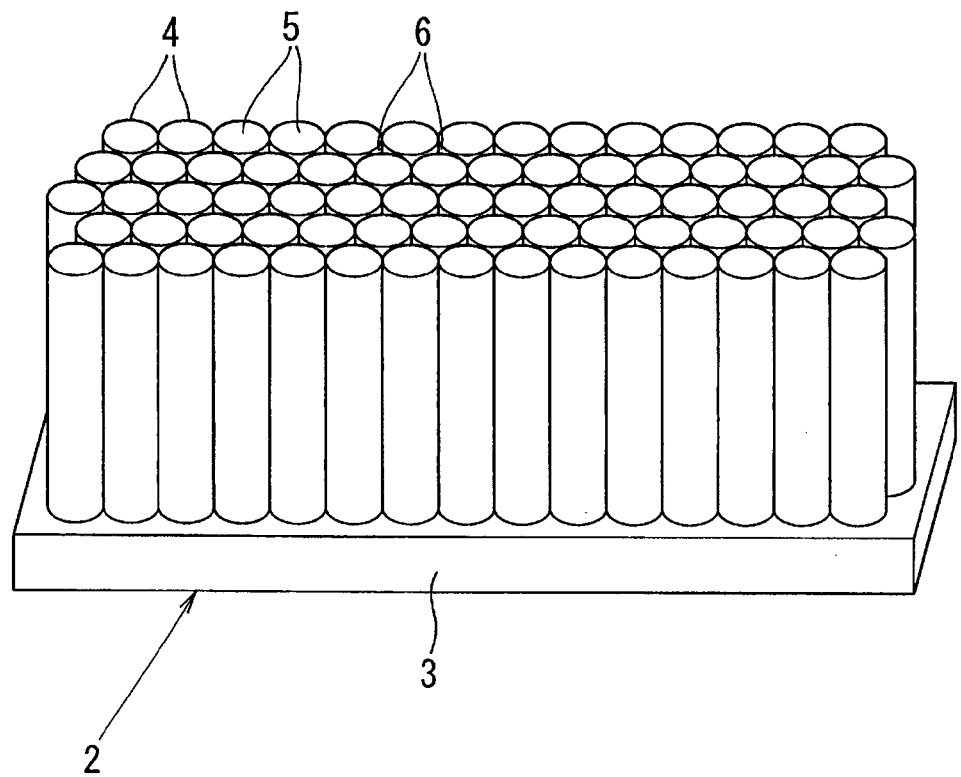
FIG. 2 is a diagram illustrating a perspective view of part of an intake duct used in the engine control system.
Figure 3:
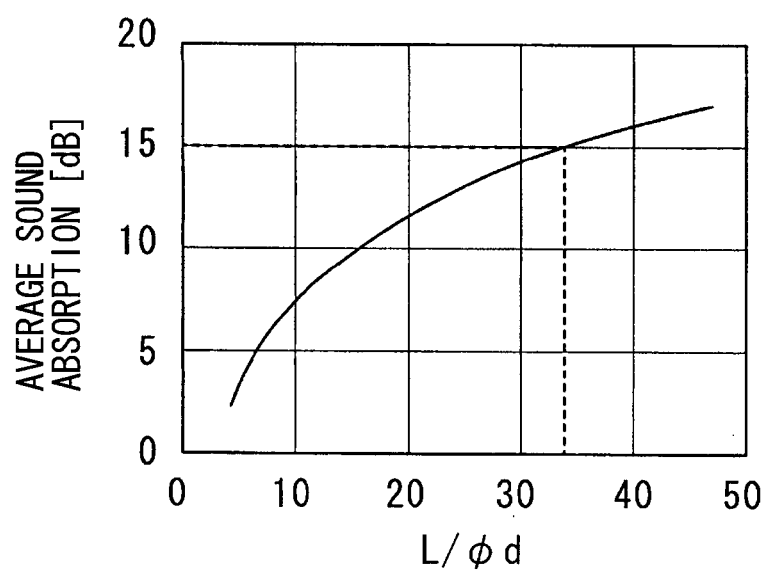
FIG. 3 is a graph showing a relationship between a sound absorption characteristic and a ratio of a length to an inner diameter of a hollow absorber of the intake duct.

A first embodiment of the present disclosure is described below with reference to FIGS. 1-3. FIG. 1 shows an engine control system. FIG. 2 shows part of an intake duct (i.e., sound absorbing structure).

The engine control system includes a turbocharger and an intake air silencer. The turbocharger compresses intake air by using pressure of exhaust gas of an internal combustion engine E. The intake air silencer absorbs intake air noise generated in an intake pipe of the engine E. The engine control system controls intake air supplied to a combustion chamber of each cylinder of the engine E.

The intake air silencer has an intake duct 1 serving as a sound absorbing structure. The intake duct 1 defines an intake passage R (refer to FIG. 4) where intake air flowing out of a compressor of the turbocharger flows.

As shown in FIGS. 1 and 2, the intake duct 1 has a rectangular tube-shaped duct body 2 and multiple hollow sound absorbers 4. Noise emitted from the compressor (i.e., sound source) is transmitted through the duct body 2. The sound absorbers 4 are made of synthetic resin and assembled together into a sound absorbing member. The sound absorbing member is attached to an inner surface of a duct wall 3 of the duct body 2 and exposed to the intake passage R so that the noise emitted from the compressor can be absorbed by the sound absorbing member. The intake passage R is defined by the inner surface of the duct wall 3 of the duct body 2. The sound absorbing member is directly attached to a predetermined portion of the inner surface of the duct wall 3 by an adhesive or the like. Alternatively, the sound absorbing member can be attached to a plate member, and the plate member can be attached to the predetermined portion of the inner surface of the duct wall 3.

Each sound absorber 4 has a circular through hole 5 extending straightly in its axis direction. The sound absorbers 4 are assembled together into the sound absorbing member in such a manner that a clearance (i.e., hole) 6 is formed between adjacent sound absorbers 4. The details of the intake air silencer, in particular, the intake duct 1, are described later.

The engine E includes, but is not limited to, a multicylinder gasoline with multiple cylinders. For example, the engine E can be multicylinder diesel engine with multiple cylinders.

The engine E is installed in an engine room of a vehicle together with the turbocharger. Each cylinder of the engine E is provided with an injector for injecting fuel into a corresponding intake port at an optimum time.

The engine E has an intake pipe and an exhaust pipe. The intake pipe defines an intake passage where intake air drawn into the combustion chamber of each cylinder flows. The exhaust pipe defines an exhaust passage through which exhaust gas flowing out of the combustion chamber of each cylinder is discharged to the outside.

The intake pipe is provided with the intake duct 1, an air cleaner 7, the compressor of the turbocharger, an intercooler 8, an electronic throttle unit, and an intake manifold. The intake manifold is connected to the intake port of each cylinder of the engine E.

The exhaust pipe is provided with an exhaust manifold, a turbine of the turbocharger, an exhaust gas cleaner (i.e., catalyst), and a muffler 9 serving as an exhaust silencer. The exhaust manifold is connected to an exhaust port of each cylinder of the engine E.

The air cleaner 7 has a filter for filtering the outside air drawn into an air introduction passage from an outside air inlet located at an upstream end of an inlet duct (i.e., outside air introduction duct).

An outlet of the air cleaner 7 is connected to a compressor housing of the turbocharger through an intake duct defining an intake passage where the intake air passing through the air cleaner 7 flows.

An outlet of the compressor housing is connected to the intercooler 8 through the intake duct 1, which defines the intake passage R where the intake air flowing out of the compressor of the turbocharger flows.

The intercooler 8 includes a cooler housing and a cooler core accommodated in the cooler housing. The cooler core cools the hot intake air compressed by the compressor of the turbocharger by exchanging heat between the intake air and a coolant such as cooling liquid or gas.

An outlet of the intercooler 8 is connected to a throttle body 11 of the electronic throttle unit through an intake duct (i.e., air connector, air hose) defining an intake duct where the intake air passing through the cooler core flows.

The electronic throttle unit includes the throttle body 11, a throttle valve 12, and an electric actuator 13. The throttle valve 12 is opened and closed adjust the flow rate of the intake air.

The throttle valve 12 is supported by a shaft 14. The electric actuator 13 rotates the shaft 14. The electric actuator 13 has a motor for opening and closing the throttle valve 12 and a deceleration mechanism for decelerating rotation of the motor and for transferring the decelerated rotation to the shaft 14. The motor is electrically connected to a battery of the vehicle through a motor drive circuit of an engine electronic control unit (ECU).

The intake manifold includes a surge tank for reducing a change in pressure of the intake air flowing from an outlet of the throttle body 11 and intake blanch pipes, each of which is connected to a corresponding intake outlet of the surge tank.

The surge tank has a surge tank room for temporarily storing the intake air and for distributing the intake air between the intake blanch pipes, each of which is connected to a corresponding combustion chamber and intake port of each cylinder of the engine E. In FIG. 1, the surge tank is not shown.

Each intake pipe branches from the surge tank room and is connected to the corresponding combustion chamber and intake port of each cylinder of the engine E. Each intake blanch pipe has an intake blanch passage for introducing the intake air to the intake port of each cylinder of the engine E.

The turbocharger has the compressor and a turbine. The compressor is located at a point in the intake pipe of the engine E. The turbine is located at a point in the exhaust pipe of the engine E. In the turbocharger, the intake air flowing through the intake pipe is compressed by the compressor, and the compressed air is supplied to the combustion chamber of each cylinder of the engine E.

When a turbine wheel 15 of the turbine is rotated by exhaust gas, a turbine shaft 16 and a compressor impeller 17 that are connected to the turbine wheel 15 rotates so that the intake air can be compressed by the compressor impeller 17.

The turbine includes the turbine wheel 15 and the turbine housing. The turbine wheel 15 has turbine blades arranged in a circumferential direction of the turbine wheel 15 and is rotated by pressure of the exhaust gas of the engine E. The turbine wheel 15 is connected through the turbine shaft 16 to the compressor impeller 17 to directly rotate the compressor impeller 17. A wheel accommodation space is formed in the center of the turbine housing. The turbine wheel 15 is rotatably held in the wheel accommodation space of the turbine housing.

Further, a turbine inlet passage and a turbine outlet passage are formed in the turbine housing. The turbine inlet passage leads the exhaust gas flowing from a confluence of the exhaust manifold to the wheel accommodation space. The turbine outlet passage leads the exhaust gas flowing from the wheel accommodation space to the exhaust gas cleaner.

The compressor includes the compressor impeller 17 and the compressor housing. The compressor impeller 17 has impeller blades arranged in a circumferential direction of the compressor impeller 17. The compressor impeller 17 is connected through the turbine shaft 16 to the turbine wheel 15 and directly rotated by the turbine wheel 15.

An impeller accommodation space is formed in the center of the compressor housing. The compressor impeller 17 is rotatably held in the impeller accommodation space of the compressor housing.

Further, a compressor inlet passage and a compressor outlet passage are formed in the compressor housing. The compressor inlet passage leads the intake gas flowing from the air cleaner 7 to the impeller accommodation space. The compressor outlet passage leads the intake gas flowing from the impeller accommodation space to the, intercooler 8 through the intake duct 1.

An engine body (i.e., cylinder block and cylinder head) of the engine E has the intake ports opened and closed by an intake valve 21 and the exhaust ports opened and closed by an exhaust valve 22.

When the engine E is a gasoline engine, the cylinder head of the engine E is provided with a spark plug 23 having a tip portion exposed to the chamber of each cylinder.

When the engine E is a four-cylinder engine, four combustion chambers (i.e., cylinder bores) are arranged in the cylinder block of the engine E in a direction in which the cylinders are arranged. A piston 24 connected through a connecting bar to a crank shaft is supported in each cylinder bore so that the piston 24 can slidably reciprocate in the cylinder bore.

The intake air silencer, in particular, the intake duct 1 according to the first embodiment is described in detail below with reference to FIGS. 1-3.

The intake duct 1 defines the intake passage R where the intake air flowing out of the compressor of the turbocharger flows.

Since the intake air is compressed by the compressor impeller 17, the intake air flowing out of the compressor is at high pressure. Therefore, it is preferable that the intake duct 1 should absorb sound over a wide range of high frequencies (e.g., from 1 kHz to 4 kHz).

As mentioned previously, the intake duct 1 is configured as a sound absorbing structure having a sound absorbing member for absorbing noise emitted from the compressor of the turbocharger (i.e., sound on the downstream side of the compressor). The intake duct 1 includes the rectangular tube-shaped duct body 2 and multiple hollow sound absorbers 4. The sound absorbers 4 are assembled together into the sound absorbing member.

The duct body 2 has a rectangular cross-section perpendicular to its axis. For example, the duct body 2 can be a single piece of synthetic resin (i.e., heat-resistant resin) such as polyamide (PA), polyphenylene sulfide (PPS), polypropylene (PP), or polybutylene terephthalate (PBT).

An upstream end of the duct body 2 in the intake air flow direction (i.e., inlet of the intake duct 1) is connected to the outlet of the compressor housing of the turbocharger. A downstream end of the duct body 2 in the intake air flow direction (i.e., outlet of the intake duct 1) is connected to an inlet of the intercooler 8.

The duct wall 3 of the duct body 2 extends parallel to a traveling direction of the noise emitted from the compressor.

Each sound absorber 4 is a circular tube having a circular cross-section perpendicular to its axis. The sound absorbers 4 are made of synthetic resin (i.e., heat resistant resin) and integrated as a single piece. Alternatively, the sound absorbers 4 can be separate pieces. For example, each sound absorber 4 can be made of polyamide (PA), polyphenylene sulfide (PPS), polypropylene (PP), or polybutylene terephthalate (PBT).

For example, the sound absorber 4 can be a narrow straight tube having the hole 5 with a diameter of 1 mm or less. The sound absorbers 4 are attached to the inner surface of the duct wall 3 of the duct body 2 and arranged in parallel to each other in the traveling direction of the noise emitted from the compressor so that the axis direction of each sound absorber 4 can be perpendicular to the traveling direction of the noise.

Each sound absorber 4 has at least one open end in the axis direction so that the open end can be perpendicular to the traveling direction of the noise emitted from the compressor.

As described in detail later, a sound absorbing characteristic of the sound absorber 4 depends on a ratio $L/\phi d$ of a length L (mm) of the sound absorber 4 in the axis direction to a diameter $\phi d$ (mm) of the hole 5 of the sound absorber 4. For example, as the ratio $L/\phi d$ is increased, an average amount of sound absorbed by the sound absorber 4 is increased.

Next, an operation of the engine control system is described below with reference to FIGS. 1-3.

The exhaust gas, discharged from the combustion chamber of each cylinder of the engine E to the exhaust manifold, flows into the wheel accommodation space through the turbine inlet passage as an inlet of the turbine housing of the turbocharger so that the turbine wheel 15 can rotate. Then, the exhaust gas flows out of the turbine outlet passage as an outlet of the turbine housing.

The rotation of the turbine wheel 15 is transferred through the turbine shaft 16 to the compressor impeller 17 of the compressor so that the compressor impeller 17 can rotate.

The intake air, drawn into the intake passage from the air cleaner 7, flows into the impeller accommodation space through the compressor inlet passage as an inlet of the compressor housing. The intake air flowing into the impeller accommodation space is compressed by the compressor impeller 17 rotating with the turbine wheel 15 so that pressure of the intake air can be increased. The compressed intake air flows from the compressor outlet passage of the compressor housing to the intercooler 8 through the intake passage R of the duct body 2 of the intake duct 1 and is cooled by the intercooler 8. The cooled intake air flows out of the cooler core of the intercooler 8 and is drawn into the intake port and the combustion chamber of each cylinder of the engine E through a throttle bore of the throttle body 11 and the intake blanch passage of the intake manifold.

As described above, according to the first embodiment, the intake duct 1 includes multiple hollow sound absorbers 4. The sound absorbers 4 are assembled together into a sound absorbing member for absorbing sound emitted from a sound source such as the compressor. Each sound absorber 4 is tube-shaped and has the hole 5 with a predetermined diameter, for example, 1 mm or less. The intake duct 1 is connected to the outlet of the compressor housing of the turbocharger. The sound absorbing member is installed inside the duct body 2 and exposed to the intake passage R where the intake air flowing out of the compressor flows. Specifically, the sound absorbing member is attached to the inner surface of the duct wall 3 that defines the intake passage R.

The sound absorber 4 is made of synthetic resin. Sound (i.e., noise) entering the hole 5 of the sound absorber 4 hits against an inner wall of the sound absorber 4 so that energy of the sound can be damped. Further, the energy of the sound can be damped by the vibration of the air in the hole 5 of the sound absorber 4.

A desired sound absorption characteristic of the sound absorber 4 can be obtained by adjusting the specifications of the sound absorber 4. For example, the desired sound absorption characteristic can be obtained by adjusting the ratio $L/\phi d$ of the length L of the sound absorber 4 in the axis direction to the diameter $\phi d$ of the sound absorber 4.

According to the first embodiment, each sound absorber has the same ratio $L/\phi d$. Alternatively, for example, the sound absorbers 4 can be divided into a first group and a second group. In this case, each of the sound absorbers 4 of the first group can have a first ratio $L/\phi d$, and each of the sound absorbers 4 of the second group can have a second ratio $L/\phi d$ different from the first ratio $L/\phi d$. In such an approach, the sound absorbing member constructed with the sound absorbers 4 having different ratios $L/\phi d$ can absorb noise over a wide frequency range.

As mentioned above, it is preferable that the intake duct 1 should absorb sound over a high frequency range from 1 kHz to 4 kHz to absorb the noise emitted from the compressor of the turbocharger. FIG. 3 is a graph illustrating a relationship between the ratio $L/\phi d$ and the average amount of sound absorbed by the sound absorber 4. As can be seen from FIG. 3, the average sound absorption amount of 15 dB over the frequency range from 1 kHz to 4 kHz can be obtained by adjusting the ratio $L/\phi d$ to 33.8 or more. For example, when the length L is 10 mm, the ratio L/φd of 33.8 or more can be obtained by adjusting the diameter φd to a value less than 0.3 mm.

Thus, the sound absorbing structure according to the first embodiment intake can exhibit high sound absorption performance over a wide frequency range, although the intake duct 1 has a relatively small size and does not require a large mounting space. In particular, the sound absorbing structure can effectively absorb noise over a wide range of high frequencies. Further, unlike the conventional sound absorbing structure, the sound absorbing structure can have a sound absorption characteristic without a worse frequency region where noise is increased rather than reduced.

A fiber assembly, such as a felt, a fiberglass, or glass wool, or a porous absorber such as a thin film, a non-woven fabric, or a urethane foam can be used as a sound absorbing member for absorbing noise emitted from a sound source. For example, the fiber assembly or the porous absorber is used as an insulator mounted on a floor of a vehicle. Generally, the fiber assembly or the porous absorber has flexibility. Therefore, assuming that such a fiber assembly or a porous absorber is used as a sound absorbing member mounted in an intake duct of an engine in order to absorb intake noise emitted from the engine or a turbocharger, the sound absorbing member is largely deformed by intake pulsation due to a change in pressure in the intake duct. As a result, a clearance or hole in the sound absorbing member may be widened or narrowed, and sound absorption characteristic of the sound absorbing member may be deteriorated.

For example, according to the first embodiment, narrow tube-shaped sound absorbers 4, each having the hole 5 with the diameter of 1 mm or less, are assembled together into the sound absorbing member. In such an approach, it is less likely that the sound absorbers 4 are deformed by the pressure change. Therefore, the sound absorbing structure can maintain its sound absorption characteristic.

Since the sound absorbing member is attached to the inner surface of the duct wall 3 of the intake duct 1 by an adhesive or the like, the intake duct 1 can be reinforced by the sound absorbing member. Accordingly, the intake duct 1, which is connected to the outlet of the compressor housing of the turbocharger, can withstand the pressure compressed by the compressor of the turbocharger even when the thickness of the duct wall 3 of the duct body 2 is reduced.

Since the sound absorbing member is located inside the duct body 2, the intake duct 1 can have a small size and does not require a large mounting space. Therefore, the intake duct 1 can be easily mounted in a vehicle, for example, in an engine room without increasing the size of the engine room.

According to the first embodiment, the clearance 6 is formed between adjacent sound absorbers 4. Since the clearance 6 can absorb noise emitted from a sound source such as the compressor, the sound absorbing characteristic of the sound absorbing structure can be improved. Alternatively, the clearance 6 can be filled with, for example, synthetic resin.

According to the first embodiment, the sound absorbing member is directly attached to the inner surface of the duct wall 3. Alternatively, the sound absorbing member can be accommodated in a tube-shaped housing, and then the housing can be attached to the inner surface of the duct wall 3.

(Second Embodiment)

An intake duct 1 according to a second embodiment of the present disclosure is described below with reference to FIGS. 4 and 5. A difference of the second embodiment from the first embodiment is as follows.

Like the first embodiment, the intake duct 1 as a sound absorbing structure includes multiple hollow sound absorbers 4 that are made of synthetic resin and assembled together into a sound absorbing member. The sound absorbing member is attached to the inner surface of the duct wall 3, which defines the intake passage R of the duct body 2, by using an adhesive or the like.

Each sound absorber 4 is a circular tube having a circular cross-section perpendicular to its axis. The sound absorbers 4 are made of synthetic resin and integrated together. For example, the sound absorber 4 can be a narrow straight tube having an inner hole 5 with a diameter of 1 mm or less.

The sound absorbing member is attached to the inner surface of the duct wall 3 of the duct body 2 in such a manner that the axes of the sound absorbers 4 are parallel to each other.

The sound absorber 4 has at least one open end in its axis direction.

The axes of the sound absorbers 4 are inclined in a direction toward (or away from) the compressor of the turbocharger at a predetermined angle θ with respect to the inner surface of the duct wall 3 of the duct body 2.

That is, the axes of the sound absorbers 4 are inclined in the direction toward (or away from) the compressor of the turbocharger at the predetermined angle θ with respect to the traveling direction of noise emitted from the compressor.

As described above, according to the second embodiment, the axes of the sound absorbers 4 of the sound absorbing member are inclined in the direction toward (or away from) the compressor of the turbocharger at the predetermined angle θ with respect to the inner surface of the duct wall 3 of the duct body 2. In such an approach, the sound absorbing member can effectively absorb a progressive wave of the noise emitted from the compressor. Thus, noise leaking out of the duct body 2 can be reduced rapidly.

In this case, the sound absorbing member may not effectively absorb a reflection wave of the noise emitted from the compressor. However, the refection wave is reduced with a reduction in the progressive wave. Therefore, the noise leaking out of the duct body 2 can be reduced by reducing the progressive wave of the noise.

Figure 5:
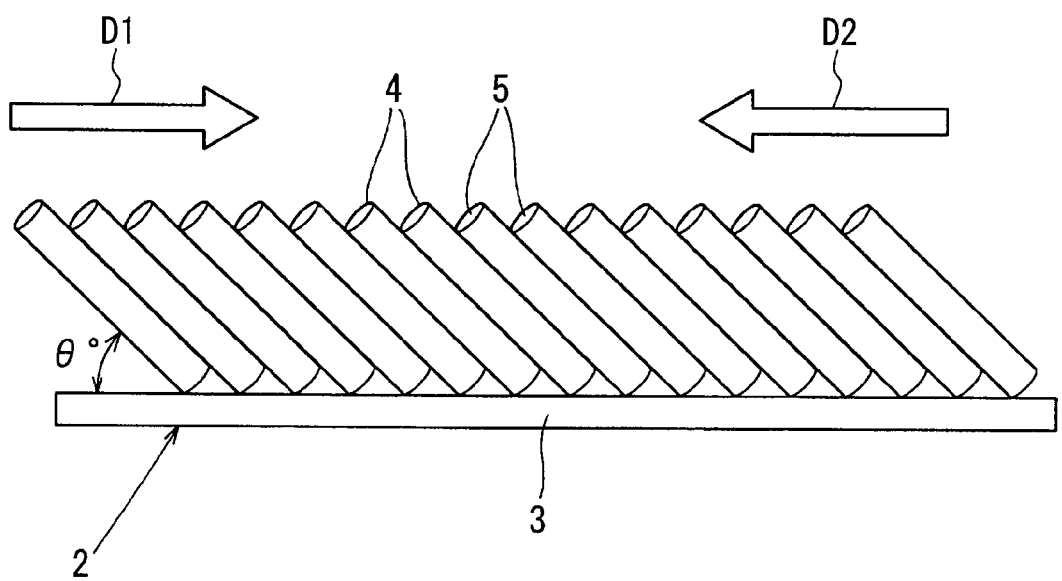
FIG. 5 is a diagram illustrating a partial cross-sectional view of FIG. 4.
Figure 6:
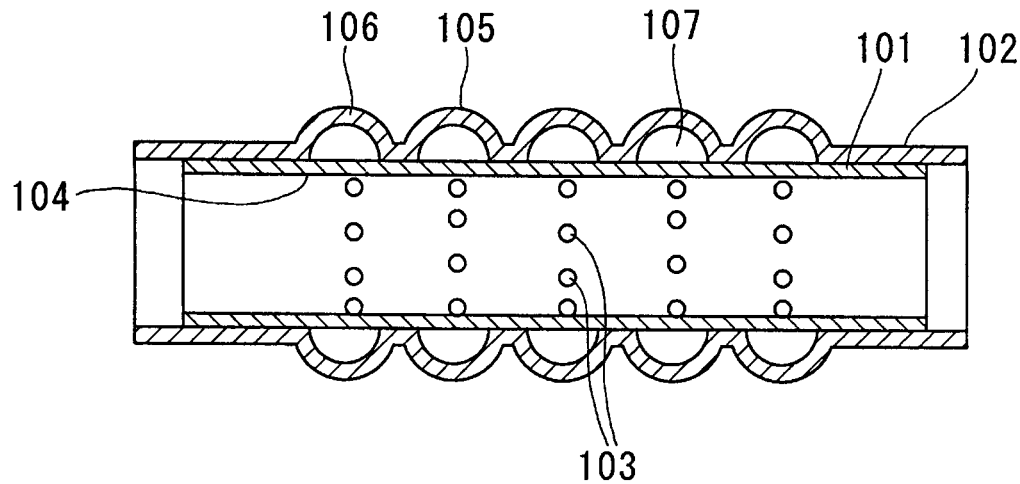
FIG. 6 is a diagram illustrating a cross-sectional view of a conventional sound absorbing structure.
Figure 7:
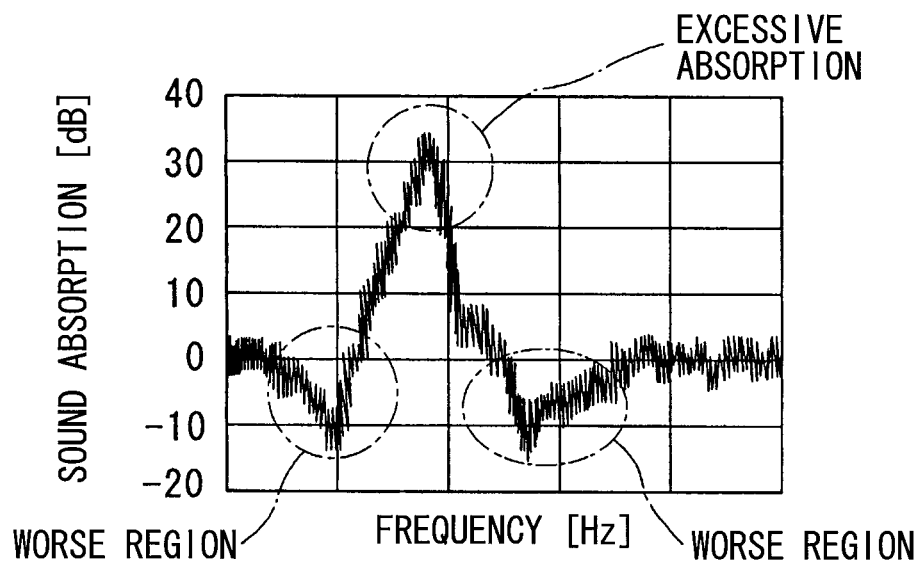
FIG. 7 is a graph showing a relationship between a sound frequency and a sound absorption characteristic of the conventional sound absorbing structure.

Specifically, as shown in FIG. 5, when the axes of the sound absorbers 4 of the sound absorbing member are inclined in the direction toward a sound source, from which a sound D1 is emitted, at the angle with respect to the inner surface of the duct wall 3 of the duct body 2, it is likely that the sound absorbing member absorbs the sound D1. In contrast, when the axes of the sound absorbers 4 of the sound absorbing member are inclined in the direction away from a sound source, from which a sound D2 is emitted, at the angle θ with respect to the inner surface of the duct wall 3 of the duct body 2, it is less likely that the sound absorbing member absorb the sound D2.

Since the axes of the sound absorbers 4 of the sound absorbing member are inclined at the angle θ with respect to the inner surface of the duct wall 3 of the duct body 2, the thickness of the sound absorbing member is reduced so that the size of the intake duct 1 can be reduced. Thus, the intake duct 1 can be easily mounded in an engine room of the vehicle.

Figure 4:
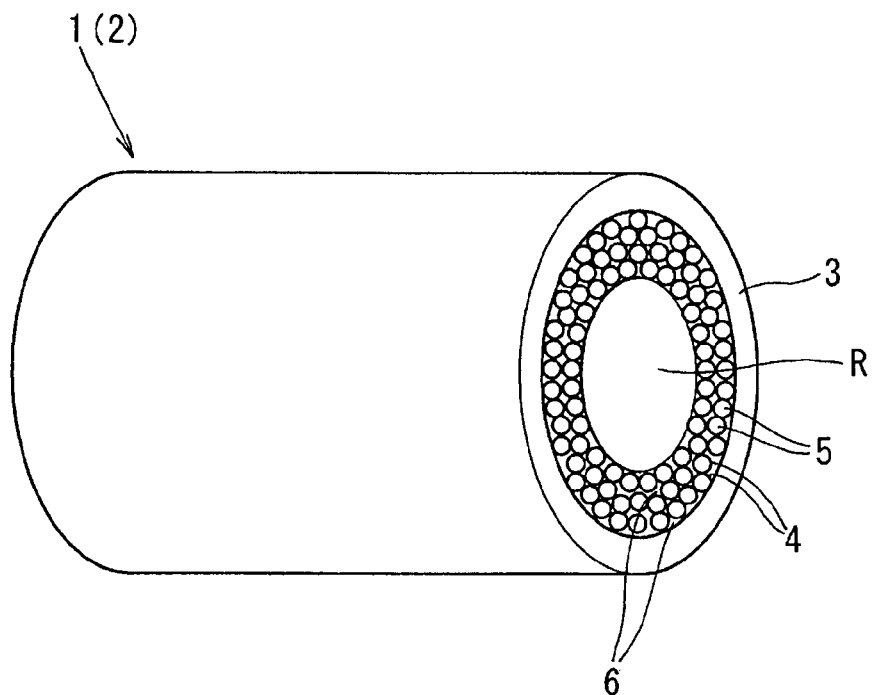
FIG. 4 is a diagram illustrating a perspective view of an intake duct according to a second embodiment of the present disclosure.

Further, according to the second embodiment, as shown in FIG. 4, a clearance 6 is formed between adjacent sound absorbers 4. Since the clearance 6 can absorb noise emitted from a sound source such as the compressor, the sound absorbing characteristic of the sound absorbing member can be improved. Alternatively, the clearance 6 can be filled with, for example, synthetic resin.

Further, according to the second embodiment, the sound absorbing member is directly attached to the inner surface of the duct wall 3. Alternatively, the sound absorbing member can be accommodated in a tube-shaped housing, and then the housing can be attached to the inner surface of the duct wall 3.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiments, as shown in FIG. 1, the intake duct 1 is located on the downstream side of the compressor impeller 17. That is, the intake duct 1 is located between the compressor impeller 17 and the intercooler 8. Alternatively, the intake duct 1 can be located on the upstream side of the compressor impeller 17. That is, the intake duct 1 can be located between the compressor impeller 17 and the air cleaner 7.

In the embodiments, the sound absorber 4 is a circular tube having a circular cross-section perpendicular to its axis. The sound absorber 4 is not limited to such a circular tube. For example, the sound absorber 4 can be a rectangular or hexagonal tube having rectangular or hexagonal cross-section perpendicular to its axis.

In the embodiments, both ends of the sound absorber 4 in its axis direction are opened. Alternatively, one end of the sound absorber 4 in its axis direction can be closed.

In the embodiments, the shape and size of one end of the sound absorber 4 is the same as the shape and size of the other end of the sound absorber 4 in its axis direction. That is, the hole 5 of the sound absorber 4 has a uniform diameter. Alternatively, at least one of the shape and size of one end of the sound absorber 4 can be different from the shape and size of the other end of the sound absorber 4 in its axis direction. That is, the hole 5 of the sound absorber 4 can have a non-uniform diameter.

The sound absorber 4 can have a curved or bent tube shape instead of a straight tube shape.

In the embodiments, the sound absorber 4 is made of synthetic resin. Alternatively, the sound absorber 4 can be made of a material other than synthetic resin.

For example, the sound absorber 4 can be formed by punching a hole in a solid base. Alternatively, the sound absorber 4 can be formed by melting a fiber or the like contained in a solid base.

In the embodiments, multiple hollow sound absorbers 4 are assembled together into a sound absorbing member. Alternatively, a porous sound absorber having multiple holes extending in its axis direction can be employed as a sound absorbing member.

For example, the porous sound absorber can be a thin film, a non-woven fabric, or a urethane foam. Alternatively, the porous sound absorber of the second embodiment can be formed by filling the clearance 6 of the sound absorbing member of the first embodiment with the same material as the sound absorber 4.

A porous sound absorber made of resin and a porous sound absorber made of metal can be assembled together into a single porous sound absorber.

The holes of the porous sound absorber can extend parallel to each other in a traveling direction of sound emitted from a sound source.

Each hole of the porous sound absorber can have at least one open end in its axis direction.

The porous sound absorber can be attached to the inner surface of the duct wall 3 of the duct body 2.

The axes of the holes of the porous sound absorber can be inclined in a direction toward (or away from) a sound source at a predetermined angle θ with respect to the duct wall 3 of the duct body 2 or a traveling direction of sound emitted from the sound source.

The sound absorbing structure according to the present disclosure can be applied to a vehicle part other than the intake duct 1, such as an air cleaner housing, a surge tank, an intake manifold, a floor, a ceiling, a wall, a door, a panel, or a hood of the vehicle. Further, the sound absorbing structure can be applied to an object other than a vehicle, such as a floor, a ceiling, a wall, a door, a panel, or a hood of a an the intake duct 1, such as air cleaner housing, a surge tank; or an intake manifold. Further, the sound absorbing structure can be applied to a floor, a ceiling, a wall, a door, a panel, a hood of a building with an acoustic chamber such as a concert hall.

In the embodiments, the duct body 2 has a straight tube shape. Alternatively, the duct body 2 can have a curved tube shape. Further, the duct wall 3 can have a concave or convex surface with a predetermined curvature radius instead of a flat surface.

What is claimed is:

1. A sound absorbing structure comprising:
   a plurality of sound absorbers assembled together into a sound absorbing member configured to absorb sound emitted from a sound source, and
   a tube-shaped duct body having a wall defining a passage where the sound travels, wherein
   each sound absorber has a hole extending in an axis direction thereof
   the sound absorbing member is attached to the wall of the duct body, and
   the axis direction is inclined toward a direction from which the sound comes at a predetermined angle with respect to the wall of the duct body.

2. The sound absorbing structure according to claim 1, wherein
   each sound absorber has a tube shape with a predetermined inner diameter.

3. The sound absorbing structure according to claim 1, wherein each sound absorber has at least one open end in the axis direction.

4. A sound absorbing structure comprising:
   a porous sound absorber configured to absorb sound emitted from a sound source, and
   a tube-shaped duct body having a wall defining a passage where the sound travels, wherein
   the porous sound absorber has a plurality of holes extending in an axis direction thereof,
   the porous sound absorber is attached to the wall of the duct body, and
   the axis direction is inclined toward a direction from which the sound comes at a predetermined angle with respect to the wall of the duct body.

5. The sound absorbing structure according to claim 4, wherein
   the plurality of holes extend parallel to each other.

6. The sound absorbing structure according to claim 4, wherein
   each hole has at least one open end in the axis direction.

* * * * *